US012312214B2

(12) United States Patent
Hesselbein et al.

(10) Patent No.: US 12,312,214 B2
(45) Date of Patent: May 27, 2025

(54) TRANSPORT SYSTEM FOR VERTICALLY TRANSPORTING GOODS AND PERSONS ON AN ABOVE GROUND CONSTRUCTION SITE

(71) Applicant: LIEBHERR-WERK BIBERACH GMBH, Biberach an der Riss (DE)

(72) Inventors: Thorsten Hesselbein, Mittelbiberach (DE); Tobias Scholz, Biberach (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 276 days.

(21) Appl. No.: 17/925,651

(22) PCT Filed: May 21, 2021

(86) PCT No.: PCT/EP2021/063715
§ 371 (c)(1),
(2) Date: Nov. 16, 2022

(87) PCT Pub. No.: WO2021/234169
PCT Pub. Date: Nov. 25, 2021

(65) Prior Publication Data

US 2023/0183041 A1 Jun. 15, 2023

(30) Foreign Application Priority Data

May 22, 2020 (DE) ..................... 10 2020 113 809.1

(51) Int. Cl.

| | |
|---|---|
| ***B66B 9/00*** | (2006.01) |
| ***B66B 9/187*** | (2006.01) |
| ***B66B 11/00*** | (2006.01) |
| ***B66C 23/02*** | (2006.01) |
| ***B66C 23/62*** | (2006.01) |

(52) U.S. Cl.
CPC .......... *B66B 9/187* (2013.01); *B66B 11/0005* (2013.01); *B66B 11/0075* (2013.01); *B66C 23/02* (2013.01); *B66C 23/62* (2013.01)

(58) Field of Classification Search
CPC . B66B 9/187; B66B 11/0005; B66B 11/0075; B66C 23/02; B66C 23/62; B66C 23/208; B66C 23/26
See application file for complete search history.

(56) References Cited

FOREIGN PATENT DOCUMENTS

| | | | | | |
|---|---|---|---|---|---|
| CN | 105050935 | A | * | 11/2015 | ............. B63B 23/28 |
| CN | 107055347 | B | * | 3/2018 | |
| DE | 3403419 | C2 | * | 1/1988 | |
| EP | 2639193 | A1 | * | 9/2013 | ............... B66B 9/00 |
| EP | 3016901 | A1 | | 5/2016 | |
| FR | 2492049 | A1 | * | 4/1982 | |
| GB | 936227 | A | | 9/1963 | |
| JP | H06-44949 | U | | 6/1994 | |
| JP | H07-277676 | A | | 10/1995 | |

* cited by examiner

*Primary Examiner* — Emmanuel M Marcelo
(74) *Attorney, Agent, or Firm* — Dilworth & Barrese, LLP.; Michael J. Musella, Esq.

(57) ABSTRACT

The invention relates to a transport system for vertically transporting goods and persons on an above-ground construction site, comprising a stewing tower crane (40, 300) and at least one construction elevator (10), wherein the stewing tower crane and the at least one construction elevator have shared anchoring (12) and are anchored or can be anchored jointly to a structure (30) by means of said anchoring.

10 Claims, 2 Drawing Sheets

TRANSPORT SYSTEM FOR VERTICALLY TRANSPORTING GOODS AND PERSONS ON AN ABOVE GROUND CONSTRUCTION SITE

BACKGROUND OF THE INVENTION

The invention relates to a transport system for the vertical transport of goods and persons on an above-ground construction site comprising a revolving tower crane and at least one construction elevator.

Construction elevators are also used in addition to cranes, in particular revolving tower cranes, on above-ground construction sites to transport the persons employed in the construction to the desired level of the building. The required revolving tower cranes and the construction elevators are positioned separately on the outer skin of the building and are guyed thereat.

For the guying, a plurality of bores in the face of the building are required for the anchoring of the guying to the building. After the dismantling of the construction equipment, these boreholes have to be individually closed again, which represents a not insubstantial effort with an increasing number of bores. The parallel erection of revolving tower cranes and construction elevators also requires a relatively large construction space. The corresponding front region is accessible only in a limited manner or not at all during the regular operation of the equipment so that further final work on the front has to be caught up on after the dismantling of the equipment here. A single revolving tower crane and two double elevators, for example, have a space requirement of approximately 15 meters in length in the horizontal direction at the front.

Against this background, solutions have already emerged for the optimization of the space requirements. Individual construction elevators are combined to form a common platform here, i.e. a plurality of elevators are attached to a common elevator tower that is guyed at the front of the building. The number of required guys and the space requirements can be reduced by this measure since each construction elevator does not have to be individually guyed.

SUMMARY OF THE INVENTION

Based on this already known solution, the present application deals with further optimization possibilities that ideally achieve a further reduction of the number of required guys and of the required construction space.

This object is achieved by a transport system in accordance with the features herein. Advantageous embodiments of the transport system are the subject of the description herein.

In accordance with the invention, it is proposed for a transport system of the category that the revolving tower crane and the at least one construction elevator have a common guying by means of which the revolving tower crane and the construction elevator can be or are guyed together at a building. The number of required guys can be further reduced by this measure. The required space requirements are also equally reduced. The revolving tower crane is ready for the lifting work of construction goods typical on construction sites while the construction elevator allows the vertical conveying of persons and materials.

Provision can advantageously be made for the use of a common guying in that the construction elevator comprises an elevator tower at which one or more elevator cars or elevator landings are guided in a vertical direction. Elevator landings are spoken of throughout in the following; they can be designed as simple platforms, in the form of cars, or as other structuring suitable for the conveying of persons and material. The elevator tower, also designed from a plurality of lattice elements, for example, can now be used to sufficiently fix at least one revolving tower crane so that a separate guying of the revolving tower crane at the building skin of the above ground building can be dispensed with. In other words, the guying of the revolving tower crane takes place at the elevator tower that is in turn guyed at the building. It is equally possible that the structural conditions are reversed and the guying of the elevator tower takes place via the guying of the revolving tower crane.

If the elevator tower, for example, provides an inwardly disposed sufficiently large hollow space that extends in the vertical direction, this hollow space can be used to erect the revolving tower crane. The crane tower therefore extends within the elevator tower.

In this embodiment, one or more guying means preferably have to be guyed between the crane tower and the elevator tower. The guying means are sensibly fastened in the region of the corner bars of the crane tower. The guying means preferably extend from the crane tower to suitable fastening points in the region of the inner corners of the elevator tower.

It is equally possible instead of the above solution with the installation of the crane tower within the elevator tower to also use the crane tower of a revolving tower crane as an elevator tower for the installation and vertical guidance of one or more elevator landings in addition to the customary crane work. Corresponding guide means are installed at the outer side of the tower structure for this purpose.

The guying of the entire structure can now take place via a common guying. It is of advantage here if one or more fastening points are provided for the fastening of a guying within the crane tower. A fastening point is ideally for the fastening of a plurality of guys, in particular two guying ropes, bars, or chains. The fastening point can be designed as a pin. The one or more fastening points are preferably disposed centrally within the crane tower, ideally on its center axis.

Required drive units for actuating the elevator landings can be installed at the tower base or alternatively at the upper crane tower. The power transmission preferably takes place via a pulley block, i.e. a hoist rope is conducted over at least one deflection pulley up to the elevator landing by the drive unit.

It is equally conceivable that the entire transport system comprising the crane tower and the one or more elevator landings supported thereat is additionally surrounded at points or completely by a cage-like structure. A cage structure surrounding the crane tower serves for the protection of the entire transport system, for example from falling building materials on the construction site or from other environmental influences. Access to the transport system can be ensured via one or more access or loading openings within the cage structure, with sensibly at least one such opening being provided on a plurality of levels or on every level. The openings can be closable.

In addition to the transport system in accordance with the invention, the present invention also relates to the operation of a transport system, in particular in accordance with the invention, comprising a revolving tower crane and at least one construction elevator. It is proposed in accordance with the invention that the revolving tower crane and the construction elevator are guyed on the construction site by means of a common guying at a building, in particular the front of the building. The advantages of such a solution have already been listed above by the statements on the transport system.

BRIEF DESCRIPTION OF THE DRAWINGS

Further advantages and properties of the invention will be explained in more detail in the following with reference to the embodiments shown in the Figures. There are shown.

DESCRIPTION OF THE PREFERRED EMBODIMENTS

Figure 1:
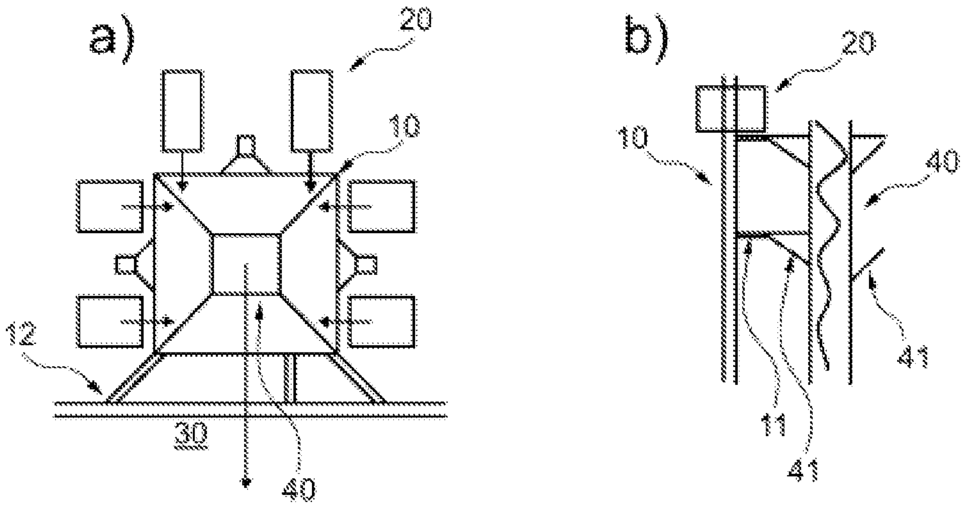
FIGS. 1*a, b*: a first embodiment of the transport system in accordance with the invention.

FIG. 1*a*) shows a plan view of the transport system in accordance with the invention in accordance with a first embodiment variant; FIG. 1*b*) shows a partial side view of the system in accordance with FIG. 1*a*). The transport system in accordance with the invention is composed of an elevator tower 10 that has a lattice-like structure and at whose outwardly disposed side surfaces a plurality of elevator landings 20 are supported in a vertically travelable manner. The total construction of the elevator tower 10 is guyed via a separate guying 12 at the front 30 of a building. A plurality of the shown guys 12 can be guyed offset from one another in the vertical direction.

The tower 40 of a revolving tower crane is erected within the elevator tower 10. The crane tower 40 is guyed at the inner side of the elevator tower 10 via mutually connected guying means 11, 41 of the elevator tower 10 and of the crane tower 40. The revolving tower crane is consequently indirectly guyed at the front 30 of the building via the elevator tower 10. The guying means 41 of the crane tower 40 extend, for example, from its corner bars outwardly in the direction of the inner side of the elevator tower 10. Corresponding counter-connection means 11 oriented in the direction of the crane tower 40 serve the fastening of the guying means 41 at the elevator tower 10 at the crane side.

Figure 2:
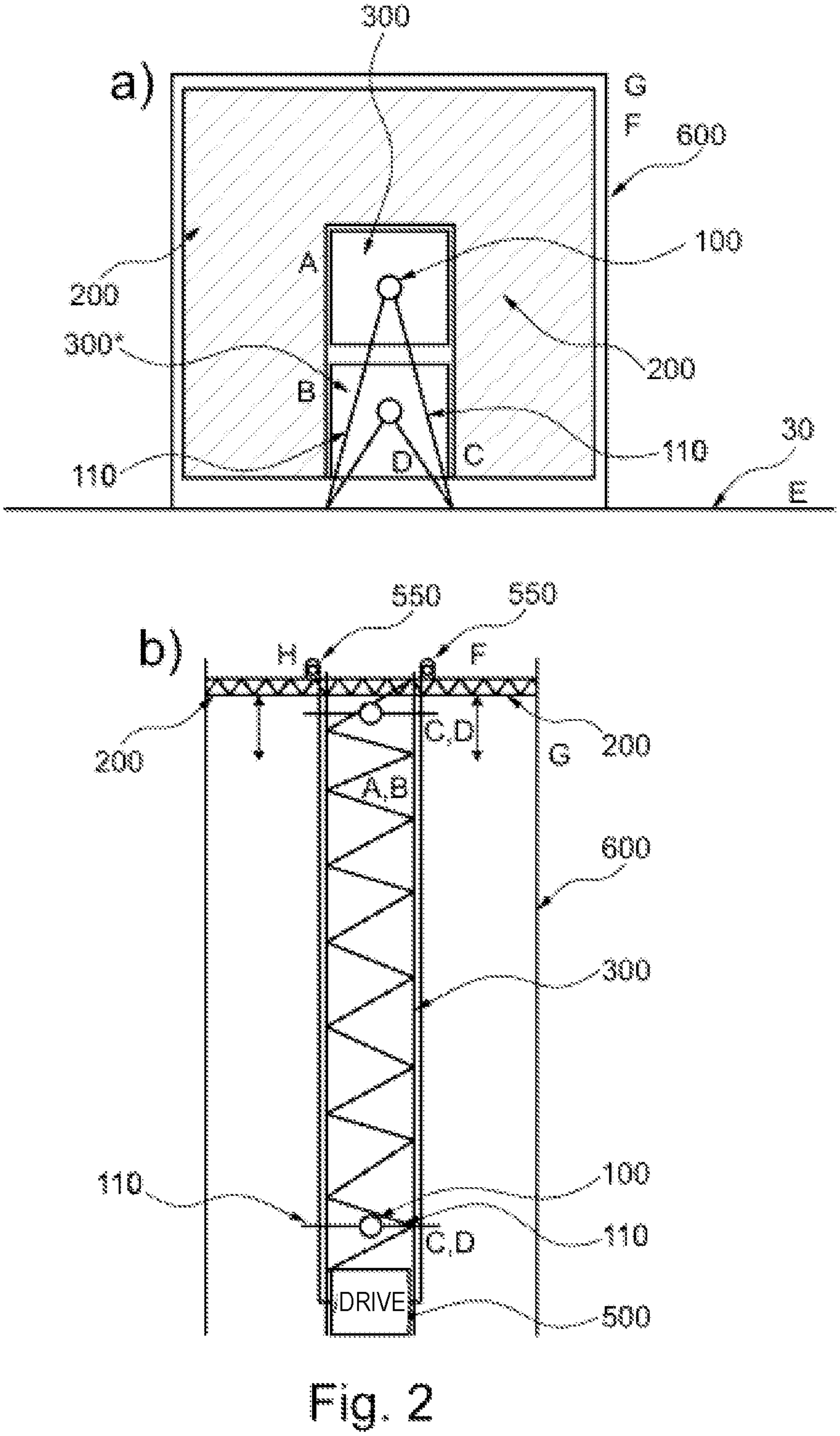
FIGS. 2*a, b*: a second embodiment of the transport system in accordance with the invention.

FIG. 2 shows a further embodiment in a plan view in FIG. 2*a* and in a side view in accordance with FIG. 2*b*. In the embodiment variant, no separate elevator tower is used, but instead the crane tower 300 of a revolving tower crane is expanded by the function of an elevator tower. The plan view of FIG. 2*a* shows two alternatives for the positioning of the crane tower 300 or 300*. In addition to the regular crane work of the revolving tower crane, it equally serves the transport of persons and material. For this purpose, one or more transport landings 200 are guided in the vertical direction at the outer side of the tower 300 consisting of lattice pieces. A drive unit 500 having a winch at the base of the tower 300 actuates one hoist rope per landing 200. Each rope is guided by the associated winch over an associated deflection pulley 550 that is suspended at the upper crane tower and that deflects the hoist rope in the direction of the respective landing 200.

The total structure of the revolving tower crane can be designed as climbable. The crane tower 300 comprises at least one tower piece having an inwardly disposed guy fastening 100 via pins from which only two guys 110 run in the direction of the front 30. Corresponding guys 110 can be provided on a plurality of level ends in the vertical direction.

There is furthermore an outer cage 600 that is laid over the total unit of the revolving tower crane 300 and the landings 200 to protect the entire unit from external influences. The protection additionally has loading or access openings on certain levels to ensure access to the landing platforms 200.

The invention claimed is:

1. A transport system for the vertical transport of goods and persons on an above-ground construction site comprising a revolving tower crane and at least one construction elevator, wherein the revolving tower crane and the at least one construction elevator have a common guying and are guyed together at a building, a plurality of elevator cars or elevator landings are guided in the vertical direction at a common elevator tower, the tower crane is positioned within a hollow elevator tower and a plurality of guying means are guyed between the tower crane and the elevator tower, and the guying means extend from corner bars of the tower crane to inner corners of the elevator tower that is rectangular in profile.

2. A transport system in accordance with claim 1, wherein the revolving tower crane is fixed or guyed at the elevator tower.

3. A transport system in accordance with claim 1, wherein the tower crane forms the elevator tower and one or more elevator landings are guided in the vertical direction at the tower crane.

4. A transport system in accordance with claim 3, wherein a guy fastening for guying the revolving tower is provided within the tower crane, with the guy fastening being suitable for the fastening of two or more guying means.

5. A transport system in accordance with claim 4, wherein the guy fastening is provided centrally close to or on the longitudinal axis of the tower crane.

6. A transport system in accordance with claim 3, wherein a respective drive unit of an elevator landing is supported at a tower base or at a tower top.

7. A transport system in accordance with claim 3, wherein hoist ropes of the one or more elevator landings are guided to the elevator landing via one or more deflection pulleys by a drive unit.

8. A transport system in accordance with claim 7, wherein the hoist ropes of the one or more elevator landings are guided around at least one deflection pulley suspended in a region of the crane tower.

9. A transport system in accordance with claim 3, additionally comprising an outer cage laid over the revolving tower crane and the landings, and being provided with one or more access or loading openings on certain levels.

10. A method of operating a transport system comprising a revolving tower crane and at least one construction elevator, wherein the revolving tower crane and the construction elevator are guyed at a building by a common guying, a plurality of elevator cars or elevator landings are guided in the vertical direction at a common elevator tower, the tower crane is positioned within a hollow elevator tower and a plurality of guying means are guyed between the tower crane and the elevator tower, and the guying means extend from corner bars of the tower crane to inner corners of the elevator tower that is rectangular in profile.

* * * * *